United States Patent [19]

Fornelli et al.

[11] Patent Number: 5,512,060
[45] Date of Patent: Apr. 30, 1996

[54] PROCESS FOR TREATING TEXTILE MATERIALS WITH ENZYME CONTAINING COMPOSITIONS AND HIGH FREQUENCY FIELDS

[75] Inventors: Saverio Fornelli, Basel, Switzerland; Illa Souren, Vaals, Netherlands

[73] Assignee: Sandoz Ltd., Basel, Switzerland

[21] Appl. No.: 439,804

[22] Filed: May 12, 1995

Related U.S. Application Data

[63] Continuation of Ser. No. 179,464, Jan. 10, 1994, abandoned, which is a continuation of Ser. No. 935,510, Aug. 26, 1992, abandoned.

[30] Foreign Application Priority Data

Aug. 27, 1991 [DE] Germany .................. 41 28 256.6

[51] Int. Cl.$^6$ .................. C12S 11/00; D06B 5/00
[52] U.S. Cl. .................. 8/115.52; 8/103; 8/115.6; 8/138; 8/DIG. 12; 435/263
[58] Field of Search .................. 8/444, 115.52, 8/DIG. 12, 111, 101, 138, 103, 115.6, 149.3; 435/263; 252/8.6, 174.12; 134/1

[56] References Cited

U.S. PATENT DOCUMENTS

| | | | |
|---|---|---|---|
| 3,646,744 | 3/1972 | Rusca | 57/34 B |
| 3,729,914 | 5/1973 | McClure | 57/34 HS |
| 3,801,274 | 4/1974 | Gleason | 8/142 |
| 4,104,019 | 8/1978 | Smith | 8/2 |
| 4,115,985 | 9/1978 | Venot | 57/34 HS |
| 4,466,258 | 8/1984 | Sando et al. | 68/5 |
| 4,576,609 | 3/1986 | Hageman et al. | 8/103 |
| 4,619,667 | 10/1986 | Ueno et al. | 8/444 |
| 4,622,238 | 11/1986 | Franz et al. | 427/45.1 |
| 4,912,056 | 3/1990 | Olson | 435/263 |
| 4,997,519 | 3/1991 | Kondo et al. | 156/643 |

FOREIGN PATENT DOCUMENTS

| | | |
|---|---|---|
| 295205 | of 1988 | European Pat. Off. . |
| 141138 | of 1988 | European Pat. Off. . |
| 362465 | of 1990 | European Pat. Off. . |
| 2485575 | of 1981 | France . |
| 2581079 | of 1986 | France . |
| 1760577 | of 1971 | Germany . |
| 3703049 | of 1988 | Germany . |
| 3729442 | of 1989 | Germany . |

OTHER PUBLICATIONS

Garner et al., "Radio Frequency Bleaching Of Cotton Fabrics, Part I: An Introductory Study", SAWTRI Technical Report, No. 559, Dec. 1984.

*Primary Examiner*—Paul Lieberman
*Assistant Examiner*—Caroline L. Dusheck
*Attorney, Agent, or Firm*—Robert S. Honor; Carl W. Battle; Hesna J. Pfeiffer

[57] ABSTRACT

A process for the treatment of a textile material comprising a) applying evenly a liquor solution (hereinafter referred to as "the liquor") for performing the treatment to the material in such a manner that the dry weight uptake of the solution at the end of this step is no more than 200%;

b) then passing the material into a high frequency field of 10–50 MHz for 1 to 120 seconds; and c) optionally maintaining the material at the temperature that the material reaches in the high frequency field for up to 15 minutes (preferably 1–5 minutes).

16 Claims, No Drawings

PROCESS FOR TREATING TEXTILE MATERIALS WITH ENZYME CONTAINING COMPOSITIONS AND HIGH FREQUENCY FIELDS

This is a continuation of application Ser. No. 08/179,464, filed Jan. 10, 1994, now abandoned, which in turn is a continuation of application Ser. No. 07/935,510, filed Aug. 26, 1992, now abandoned.

The invention relates to a process for treating of textile material, for example for degreasing, desizing, degumming (of silk) or deburdng. Application can be carried out by art known procedures (e.g. padding). After obtaining the desired effect, degenerated residues and excess application solution are washed out. The invention can also be used to treat already dyed textiles, for example to give an "old fashioned look".

Treatments of this type are known. For instance pretreatments, such as peroxide bleaching of raw and desized cotton, (of natural fiber from plant sources such as linen, jute and semilinen material or of natural fibers from animal sources, such as wool and silk) enzymatic bleaching of regenerated cellulose fibers (such as viscose, modal and spin rayon) are known. Further pretreatments include deweighting of synthetic fibers, enzymatically desizing of raw cotton having starch sizes, the enzymatic degumming of silk and the defelting as well as the cleaning of wool. The protonated acid treatment of strongly pigmented and high mineral-content cotton as well as the enzymatic scour boiling of cotton and other cellulose fibers are known.

Further treatments also include treatments that are not classified as pretreatments such as enzymatic treatments to give the "old fashion look" on dyed cotton.

Known textile treatment processes have a number of disadvantages. One needs for example, a large amount of chemicals, the disposal of which requires much effort to avoid ecological damage.

In short it has been found a) by most oxidation/reduction one step processes with peroxides, an insufficient whiteness can be produced;

b) for continuous processes, large volume steamer vessels and other apparatuses are needed;

c) it is often necessary to dry the fiber in between steps from time to time (which is energy consuming) in order to allow maximum profit to occur from subsequently used solutions for scour boiling, complexing, bleaching and washing;

d) a large consumption of chemicals is unavoidable, especially as the chemicals tend to react slower with the OH groups of cellulose than with the OH groups of water, which causes the reaction procedures to run inconsistently;

e) special vessels highly resistant to corrosion for the alkali are needed and large amounts of chemicals are required to dispose of the resultant waste; and f) all conventional methods tend to give clear damage to the material.

According to the invention, there is provided a process (preferably a continuous process) for the treating of a textile material (preferably to bleach, to degum, to deburr, to desize, to modify a dyeing or pigmentation or to remove excess pigment or mineral on the material) comprising a) applying evenly a liquor solution (hereinafter referred to as "the liquor") for performing the treatment to the material in such a manner that the dry weight uptake of the solution at the end of this step is no more than 200% (preferably 80–120%);

b) then passing the material into a high frequency field of 10–50 MHz for 1 to 120 seconds; and c) optionally maintaining the material at the temperature that the material reaches in the high frequency field for up to 15 minutes (preferably 1–5 minutes).

Preferably the temperature in step c) is about 100° C.

Preferably application of "the liquor" is by impregnating the material with "the liquor" followed by removing excess solution from the material (e.g. by means of squeezing off excess solution) so that the dry weight uptake is not more than 120%.

Preferably the liquor is a solution.

Preferably high frequency field generators are in the range of 20–100 KW, preferably 30–60 KW high frequency output.

The high frequency field can be set up between two parallel plate electrodes or for piece work, stray field electrodes can be used. Stray field electrodes comprise circular rods located transverse to the motion of the material.

The distance of the electrodes apart has to be chosen so that there is no spark discharge interferences. Due to the variable thickness of the material, the distance between the materials has to be adjustable.

High frequency field generators are well known—especially for drying of textile materials. Such generators operate in the range of 20–300 KW preferably 30–60 KW. Companies that produce such driers include Kranz (Aachen, Germany), Strayfield (Reading, England), Thres (Coesfeld, Germany) Pegg Whiteley (Leicester, England) and Clemsy (Mulhouse, France) to name a few.

Preferably the process of the invention is carded out as a continuous process. The material to be treated is impregnated with "the liquor" and excess liquor is squeezed off so that no more than 100% dry weight uptake of "the liquor" remains on the material after which the material passes through an HF field for a short time (1–120 seconds, preferably 2–10 seconds )

Preferably a process according to the invention is for use in improving the handle properties of the material to be treated.

Preferred "the liquor" includes:

a) peroxide bleach solutions, b) enzymatic bleach solutions (e.g. cellulases), c) enzymatic desizing solution (e.g. amylases), and d) enzymatic deweighting solutions.

Preferably "the liquor" is an aqueous solution containing up to 20 ml (preferably 5–10 ml) of the active treatment agent per liter.

For many applications, "the liquor" used can be one that contains non-etching agents and/or enzymes.

Preferably "the liquor" has a conductivity of 1–50 mS, preferably 1–25 mS, especially 4–20 mS (based on electrodes of 1 cm$^2$ having a distance of 1 cm). Electrolyte such as NaCl or MgCl$_2$ for adjusting the conductivity can be added if desired.

By the application of HF field on material having liquor applied in very short liquor to goods ratio, it can be observed how the decomposition products in the inner portion of the material are forced out and can then be washed from the surface.

After removal of decomposed products and the application solution, a well treated textile material results.

For example when bleaching cellulose and synthetic fibers, a high whiteness (CIE value) is obtained and at the same time a high DP value is obtained as well as a good absorption height.

After treating the material in the high frequency field, the material may be kept for a time at the temperature initiated by the HF field prior to washing. This temperature is, in general close to and below 100° C.

Finally it is possible for the material after passing through the HF field to be treated before washing with a steam imparting process for short time at a specific temperature.

Textile materials that can be treated according to the invention include fabrics, knitted goods, non-wovens, fiber fleeces, hanks, tread and yarn.

The invention will now be illustrated by the following Examples.

EXAMPLE 1

Peroxide bleaching:

1 a 1) A desized cotton fabric is impregnated with an aqueous solution of, per liter

---

0.3 g of magnesium chloride
8 ml of a commercially available tenside (Sandoclean ® PC liquid)
2 ml of a sequestering agent (commercial product Sirrix ® AK liquid)
8 ml of a commercially available stabilizer (Poly α-hydroxy acrylic acid sodium salt commercially available as Sifa ® liquid)
5 ml of NaOH - 36 Bé and
60 ml of 35% $H_2O_2$

---

The fabric is squeezed, after application of the solution to leave a dry weight increase of 80–100% and then the fabric is passed through a high frequency field of 13.56 MHz for 10 seconds. The whole treatment is then repeated after which the fabric is washed and dried. Goods have a white grade of (CIE) 62.5, absorption height of 70 mm and the DP value is 2350.

In a similar fashion

1a2) an untreated cotton fabric

1a3) a cotton fabric

1a4) a desized cotton fabric (in hank form)

1a5) a linen fabric

1a6) a semi-linen fabric

1a7) a jute fabric can be treated.

In each case the bleaching effect is excellent and the absorption height H is significantly increased and the average depolymerization grade (DP value) remains at an acceptable level.

1 b 1 ) A woolen fabric is impregnated with an aqueous solution, which contains per liter 5 ml of the above tenside, 2 ml of the above stabilizer, and 15 ml of 35% $H_2O_2$ brought to a pH 9 with sodium carbonate. The fabric is, after application of the solution then squeezed to leave a dry weight increase of 80–100%. The fabric is passed through a high frequency field of 13.56 for 10 seconds.

1b2) Natural silk is treated in a similar fashion to the process 1b1 above.

In both cases, after washing and drying a good bleaching effect occurs with minimal fiber damage

EXAMPLE 2

Enzymatic bleaching of regenerated cellulose material.

2a1) A viscose fabric is impregnated with an aqueous liquor containing per liter 4 ml of the tenside of Example 1 and 5 ml of a commercially available cellulase preparation (Bactosol® CA liquid).

which liquor is brought to pH 5 by the addition of glacial acetic acid. The fabric is squeezed after application of the solution to leave a dry weight increase 90% and then the fabric is passed through a high frequency field (13.56 MHz) for 10 seconds.

Example 2a1 can be repeated with

2a2 a modal fabric

2a3 a spun rayon (artificial wool) fabric.

In each case, after washing and drying a good bleaching effect occurs with good handling properties and minimum fiber damage.

By repeating Example 1 and 2, using a high frequency field of 27.12 MHz and 40.68 MHz a similar result occurs.

EXAMPLE 3

Enzymatic deweighting of synthetic polyamide

A fabric of synthetic polyamide is treated according to Example 2. The treated fabric has excellent handling properties similar to the feel of imitation silk. Up until now, no such good effect has been achieved to our knowledge with deweighting treatments.

EXAMPLE 4

Enzymatic desizing of starch sizes on raw cotton

A raw cotton fabric is impregnated with an aqueous solution containing, per liter, 6 ml of the tenside of Example 1 and 5 ml of a commercially available amylase product (Bactosol® HTN liquid)

and the liquor is brought to pH 6.5. The fabric is impregnated and then squeezed to leave a 100% dry weight increase. Further treatment is as treated according to Example 2. A fabric having the value 5 on the Tegewa scale (i.e. maximum value) occurs. Raw cotton has a Tegewa value of 1.

EXAMPLE 5

Enzymatic preparation of an "old fashion look" on dyed cotton.

A cotton fabric dyed with C.I. Reactive Red 147 is treated according to the method of Example 2. Good handle properties occur.

Compared to a conventional method, time is saved and less water and chemicals are used to obtain a similar effect.

EXAMPLE 6

Enzymatic degumming of silk

6a) A silk fabric is placed in an aqueous liquor, brought to pH 8 with soda, containing per liter 4 ml of the tenside of Example 1 and 4 ml of a commercially available protease (Bactosol® SI liquid conc.)

This is impregnated and squeezed to a dry weight increase of 90% and is then further treated as in Example 2.

6b) Enzymatic deburring and simultaneous removal of felt fibers of wool.

The wool substrate is treated as in Example 6a above.

In both treatments, the substrates have improved handle properties.

EXAMPLE 7

Enzymatic cleaning of wool.

A wool fabric is impregnated with an aqueous liquor containing per liter 4 ml of the tenside of Example 1, 4 ml of a commercially available cellulase preparation (Bactosol® CA liquid), and 4 ml of a lipase (commercially available as Bactosol® LI Liquid).

The liquor is brought to pH 5.5 by the addition of glacial acetic acid. Impregnation is carried out and is squeezed to 100% dry weight uptake and then further treated according to Example 2. The resulting wool is thoroughly defatted, the deburring is good and the handle properties are improved.

EXAMPLE 8

Protonated treatment of strongly pigmented and high mineral containing cotton.

A strongly pigmented, high mineral containing raw cotton substrate is impregnated with a liquor containing, per liter;

4 ml of tenside of Example 1; and
10 ml of an acid combination of
15% citric acid
15% sodium gluconate
3.2% hydrochloric acid
66.8% water (all % being by weight)

After application of the solution the fabric is squeezed to leave a 90% dry weight increase and then further treated according to Example 2.

EXAMPLE 9

Enzymatic degreasing.

Cotton yarn in hank form is impregnated in an aqueous liquor containing per liter 5 ml of tenside of Example 1

5 ml of a commercially available lipase preparation (Bactosol® LI liquid) that has been brought to a pH of 8.

After application of the liquor, the fabric is squeezed to leave a dry weight increase of 90%. The substrate is then further treated according to Example 2

An excellent degreased cotton yarn occurs.

® in the Examples signifies a trademark

We claim:

1. A process for the treatment of textile material comprising the process steps of:

a) applying a liquor solution to impregnate a textile material in an amount such that the dry weight uptake of the solution is no more than 200%;

b) subsequently passing the impregnated textile material into a high frequency field of 10–50 MHz for 1 to 120 seconds, and c) optionally maintaining the impregnated textile material at the temperature that the textile material reaches in the high frequency field for up to 15 minutes, wherein the liquor is selected from the group consisting of enzymatic bleach solutions, enzymatic desizing solutions, and enzymatic deweighting solutions.

2. The process according to claim 1 in which the liquor used to impregnate the textile material is applied such that dry weight uptake is not more than 120%.

3. The process according to claim 1 in which the temperature in step c) is 90° to 100° C.

4. A continuous process for the treatment of textile materials comprising the process steps according to claim 1.

5. The process according to claim 1 which includes the further process step of, subsequent to the impregnation of the textile material, removing excess liquor solution so that no more than 100% dry weight uptake of the liquor solution remains in the textile material.

6. The process according to claim 1 wherein the liquor solution is an aqueous solution containing up to 20 ml of an active treatment agent per liter of aqueous solution.

7. The process according to claim 1 characterized in that the process imparts improved handle properties to the textile material.

8. Textile materials which have been treated by the process according to claim 1.

9. The process according to claim 1 in which the liquor solution has a conductivity of 1–50 mS.

10. The process according to claim 1 which further comprises the process steps of:

d) maintaining the textile material at the temperature established by the high frequency field in step b), and, e) subsequently washing the textile material.

11. The process according to claim 1 which comprises the further steps of:

d) contacting the textile material with steam subsequent to step b) or step c), and e) subsequently washing the textile material.

12. The process according to claim 1 wherein the textile material is selected from the group consisting of:

fabrics, knitted goods, non-wovens, fiber fleeces, hanks, thread and yarn.

13. A process for the treatment of textile material comprising the process steps of:

a) applying a liquor to impregnate a textile material in an amount such that the dry weight uptake of the solution is no more than 200%;

b) subsequently passing the impregnated textile material into a high frequency field of 10–50 MHz for 1 to 120 seconds, and c) optionally maintaining the impregnated textile material at the temperature that the textile material reaches in the high frequency field for up to 15 minutes wherein the liquor is an enzyme containing textile treatment composition.

14. A process according to claim 13 wherein the textile treatment composition contains a lipase.

15. A process according to claim 13 wherein the textile treatment composition contains a protease.

16. A process according to claim 13 wherein the textile treatment composition contains an amylase.

* * * * *